US006321536B1

(12) United States Patent
Henderson et al.

(10) Patent No.: US 6,321,536 B1
(45) Date of Patent: Nov. 27, 2001

(54) PNEUMATICALLY CONTROLLED EXHAUST THROTTLE FOR DELIVERING EGR ON TURBOCHARGED ENGINES

(75) Inventors: Gregory H. Henderson; Scott A. Henry, both of Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/732,261

(22) Filed: Dec. 7, 2000

(51) Int. Cl.⁷ ................................................. F02B 33/44
(52) U.S. Cl. .............................................. 60/605.2; 60/611
(58) Field of Search ................................ 60/605.2, 611; 123/568.11

(56) References Cited

U.S. PATENT DOCUMENTS

| 4,083,188 | * | 4/1978 | Kumm | ................................... | 60/605 |
| 4,349,004 | * | 9/1982 | Matsuda | .............................. | 123/569 |
| 4,350,013 | * | 9/1982 | Yoshiba | ................................. | 60/605 |
| 4,484,445 | | 11/1984 | Gillbrand | ............................... | 60/605 |
| 4,669,442 | | 6/1987 | Nakamura et al. | .................. | 123/571 |
| 5,440,800 | | 8/1995 | Ceynow et al. | .................... | 60/605.2 |
| 5,806,308 | | 9/1998 | Khair et al. | ............................ | 60/278 |

FOREIGN PATENT DOCUMENTS

| 26 20 594 | 5/1976 | (DE) . |
| 32 18 156-A | 5/1982 | (DE) . |
| 0 531 277 | 8/1992 | (EP) . |
| 54-148927 | 11/1979 | (JP) . |

* cited by examiner

Primary Examiner—Hoang Nguyen
(74) Attorney, Agent, or Firm—Woodard, Emhardt, Naughton, Moriarty & McNett

(57) ABSTRACT

A pneumatic throttle system for maintaining sufficient exhaust pressure to maintain exhaust flow through an EGR system. The throttle system includes an apertured throttle plate positioned to selectively restrict the flow of exhaust gasses exiting the engine. Movement of the plate is controlled by a pneumatic piston assembly connected thereto. The piston assembly includes a piston movably mounted within a gas-tight chamber. The piston head functionally divides the chamber into two variable-volume portions. The first chamber portion is pneumatically connected to the intake manifold, while the second portion is pneumatically connected to the exhaust manifold. The gas pressure in one chamber portion relative the other determines the relative volume of each chamber portion according to $P_1V_1=P_2V_2$. The piston moves within the chamber to satisfy the above relationship. As the piston moves in response to changes in the respective manifold pressures, the throttle plate moves to increase or decrease gas flow therethrough, accordingly changing the exhaust back-pressure.

17 Claims, 3 Drawing Sheets

PNEUMATICALLY CONTROLLED EXHAUST THROTTLE FOR DELIVERING EGR ON TURBOCHARGED ENGINES

TECHNICAL FIELD OF THE INVENTION

The present invention relates generally to internal combustion engines and, more particularly, to a pneumatic throttle system for the maintaining sufficient engine exhaust gas pressure to maintain flow of exhaust gasses through an EGR emission control system.

BACKGROUND OF THE INVENTION

Internal combustion engines produce exhaust gasses containing by-products of inefficient or incomplete combustion. Among these by-products are such pollutants as carbon monoxide, nitrous oxides, and a variety of hydrocarbons. Even diesel engines, which use a higher air-to-fuel ratio than do gasoline (Otto cycle) engines, produce excessive nitrous oxides along with hydrocarbons and carbon monoxide. These combustion by-products are undesirable because they are both harmful to the environment and wasteful.

Carbon monoxide is a known greenhouse gas and is also toxic in large quantities, since it is preferentially absorbed over oxygen in red blood cells. Some nitrous oxides are also toxic, and contribute to acid rain. And among the plethora of hydrocarbons produced by inefficient combustion are carcinogenic benzpyrene and nitroaromates. Inefficient combustion is also wasteful insofar as the carbon monoxides, nitrous oxides, and hydrocarbons may yet be further oxidized to release potential chemical energy stored within.

One known method of removing the by-products of inefficient combustion is to pass the exhaust stream through an exhaust gas recirculation (EGR) system, as illustrated schematically in FIG. 1. In general, EGR systems 10 direct a portion of the gas exiting an engine exhaust manifold 12 back into the engine intake manifold 14, such that the recirculated exhaust gas may participate in the combustion process a second time. At least some of the by-products of inefficient combustion present in the recirculated exhaust gas are completely oxidized as they once again pass through the engine 16 and are exposed to the combustion process ongoing therein. While this method is efficient in reducing the level of inefficient combustion by-products (especially nitrous oxides and carbon monoxide) ultimately emitted by the engine 16, the exhaust gasses must first be cooled before being reintroduced into the engine 16 in order to control the combustion process. Cooling is accomplished by routing the hot exhaust gasses through a cooling chamber 18. One requirement of any EGR system 10 is that the pressure of the gasses exiting the engine exhaust manifold 12 be greater than the pressure of the gasses entering the engine air intake manifold 14 so that the exhaust gasses will flow into the intake manifold 14. Compressor 20 and turbine 22 sizes and efficiencies determine this manifold pressure gradient in the absence of a pressure assist device. Without a pressure assist device to maintain the exhaust gas at a pressure greater than the intake manifold pressure, the EGR system 10 will not function under all engine conditions (such as when torque is relatively high and revolutions are relatively low—see FIG. 2). Electronic throttle systems for maintaining an elevated exhaust gas back-pressure are known in the art. One such system is described in U.S. Pat. No. 5,806,308 to Khair, et al., EXHAUST GAS RECIRCULATION SYSTEM FOR SIMULTANEOUSLY REDUCING $NO_x$ AND PARTICULATE MATTER. These systems include electromechanically actuates throttle mechanisms. The electromechanical throttle mechanism requires microprocessors for performing the control functions. These devices also require gas pressure sensors (such as a differential pressure sensor or a mass flow transducer) for measuring the exhaust gas flow rate or pressure. The exhaust gas data is transmitted to the microprocessor, which calculates the current exhaust gas pressure, compares the calculated exhaust gas pressure to the desired exhaust gas pressure, and actuates throttling to approach the desired exhaust gas pressure. One disadvantage of systems of this type is the requirement of a plethora of electrical devices, such as the electromechanical throttle, microprocessor, and sensor. In addition to adding bulk and expense, such a system is vulnerable to the degradation or failure of any one of a number of electrical connections. Further, the increased complexity of the system increases the time and expense of repairs when a problem develops.

There is therefore a need for a cheap and reliable system for controlling exhaust gas pressure such that exhaust gas pressure is substantially always maintained at a desired level. The present invention is directed towards meeting this need.

SUMMARY OF THE INVENTION

The present invention relates to a pneumatic throttle system for the maintaining sufficient engine exhaust gas pressure to maintain flow of exhaust gasses through an EGR emission control system. The throttle system includes a throttle plate positioned to selectively restrict the flow of exhaust gasses exiting the engine. The throttle plate is operationally connected to a pneumatic piston assembly such that movement of the piston operates to control the throttle plate. The piston assembly includes a piston movably mounted within a chamber. The piston head functionally divides the chamber into two portions of variable volume. A first portion of the chamber is pneumatically connected to the engine intake manifold, while a second portion of the chamber is pneumatically connected to the engine exhaust manifold. The position of the piston in the chamber (and, therefore, the degree to which the throttle plate restricts exhaust gas flow from the engine) is determined by the relative intake and exhaust gas pressures. If the intake manifold pressure increases such that it is greater than the exhaust manifold pressure, the piston is displaced to allow the volume of the first portion to increase at the expense of the volume of the second portion. This displacement of the piston also operates to move the throttle plate to further restrict the flow of the exhaust gasses from the engine, thereby increasing the exhaust gas back-pressure.

Careful selection of the parameters of the system (i.e., the dimensions of the gas conduits, the dimensions of the chamber and piston, the mass of the piston, the size of the throttle plate, the dimensions and calibration of the members connecting the piston and the throttle plate, etc. . . . ) allow for precise control of the exhaust gas pressure range. If an EGR system is connected to the engine, the pneumatic throttle system may be calibrated to ensure proper exhaust gas flow through the EGR system over the widest possible range of engine operating conditions.

One object of the present invention is to provide an improved pneumatic throttle for maintaining the exhaust gas of an internal combustion engine system at a pressure greater than that of the intake manifold. Related objects and advantages of the present invention will be apparent from the following description.

DETAILED DESCRIPTION OF THE PREFERRED EMBODIMENT

Figure 1:
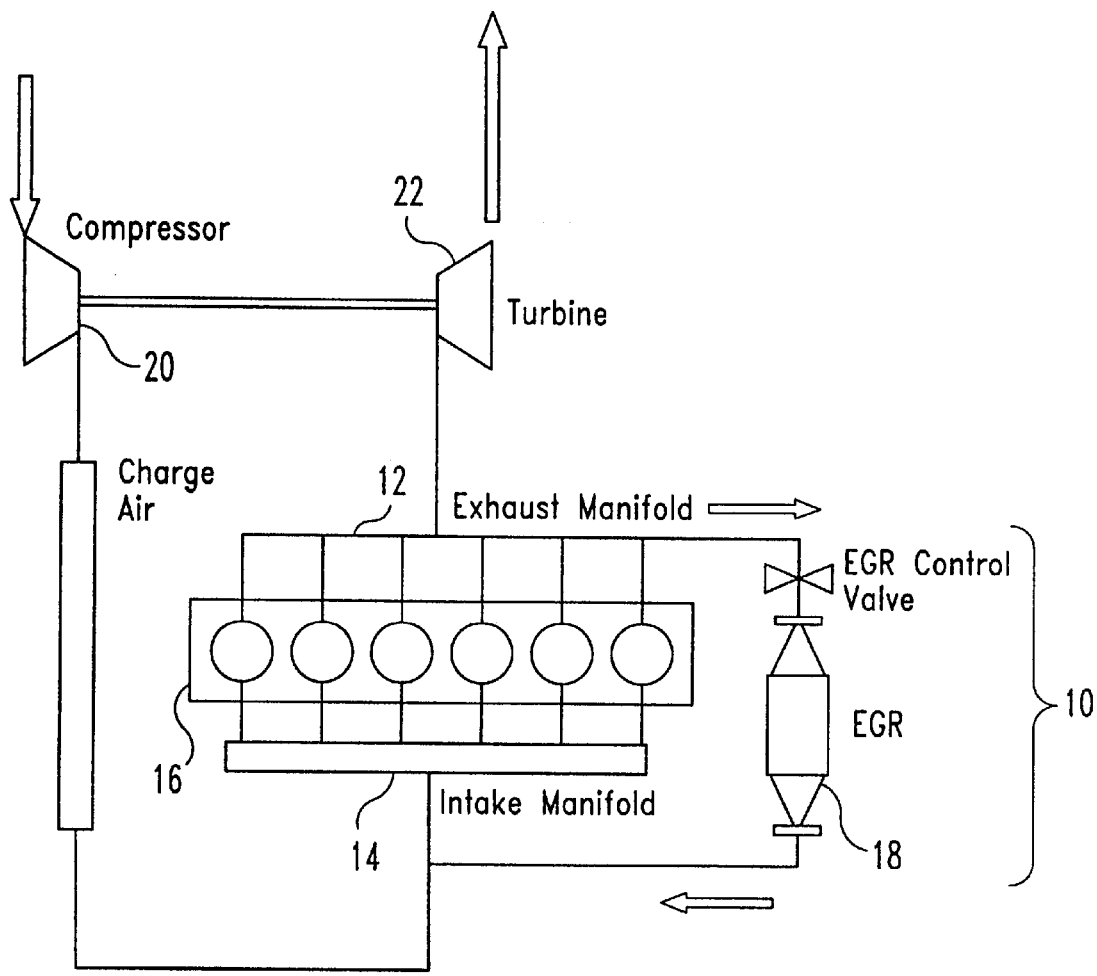
FIG. 1 is a schematic view of a prior art engine having an EGR system without a pressure assist device.
Figure 2:
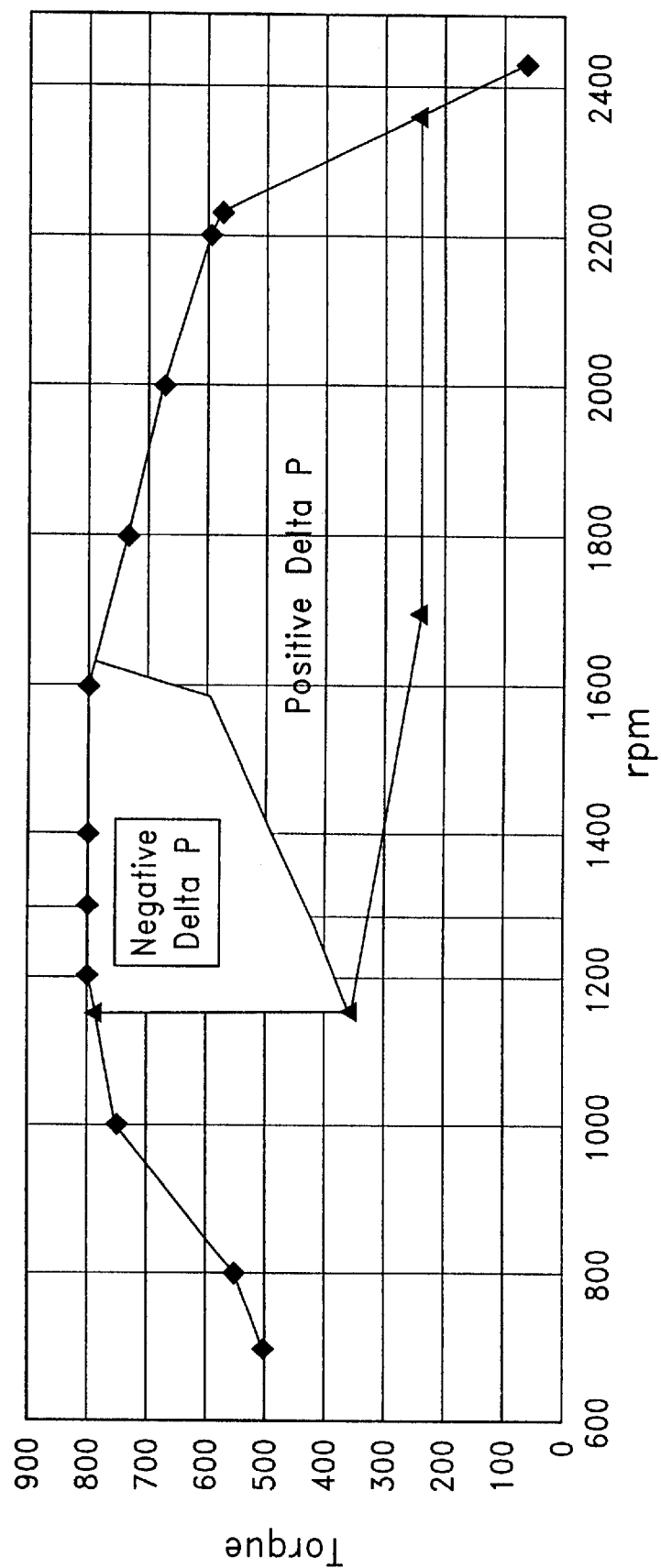
FIG. 2 is chart illustrating typical manifold pressure gradients as functions of torque and rpm.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
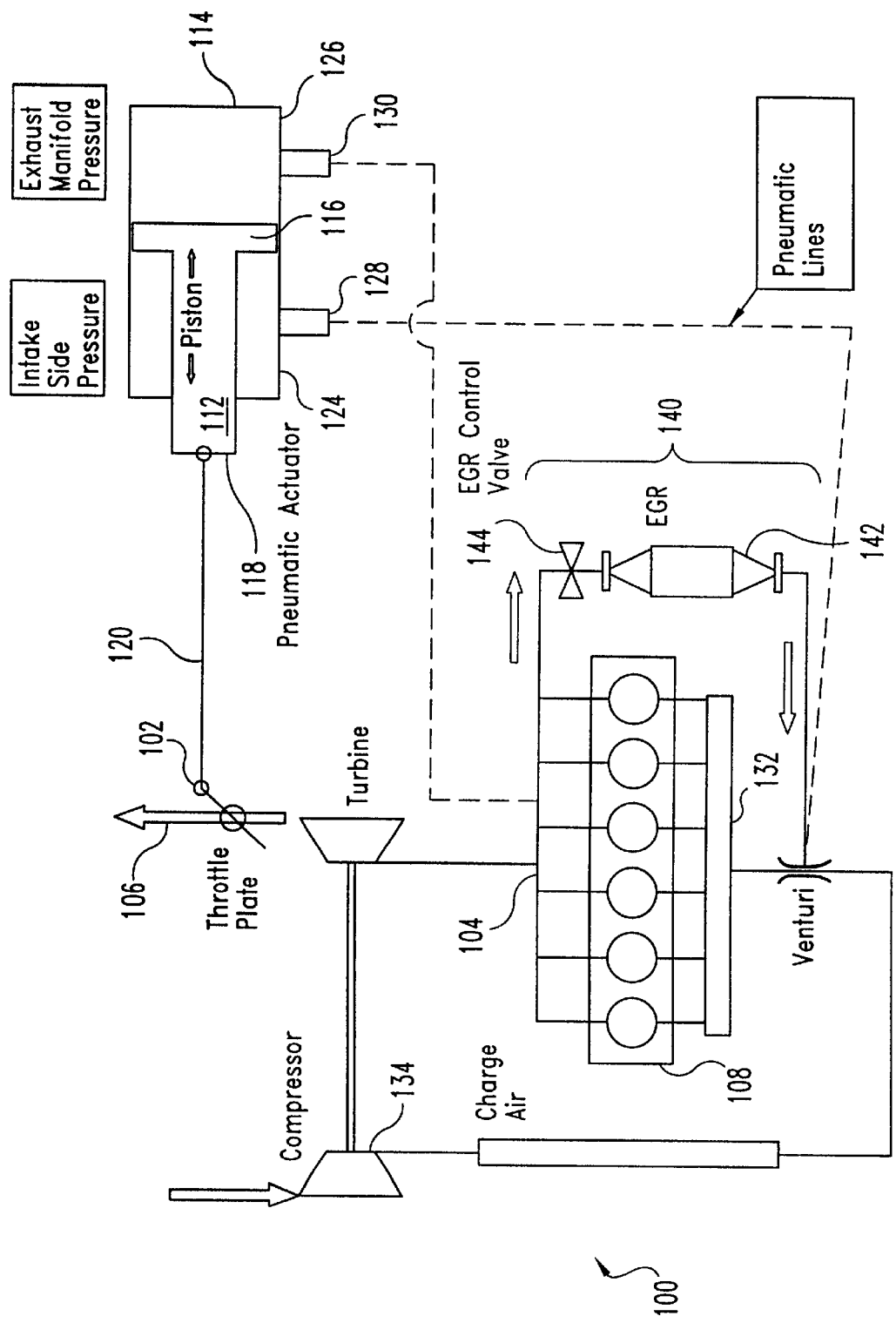
FIG. 3 is a schematic view of an engine system including a first embodiment automatic pneumatic throttle system of the present invention.

FIG. 3 schematically illustrates a first embodiment of the present invention, a pneumatically controlled throttle system 100. The throttle system 100 preferably includes a throttle plate 102 which may be positioned in a fluid stream, such as the in exhaust gas stream flowing between the exhaust manifold 104 and the exhaust port 106 of an internal combustion engine 108. The throttle plate 102 is adapted to selectively restrict the flow of fluids therethrough, preferably by including an orifice of variable area, such that the throttle plate 102 may selectively move to increase or decrease the orificial area.

The throttle plate 102 is controlled by a pneumatic actuator assembly 110 connected thereto. The pneumatic actuator assembly 110 includes a piston 112 movably positioned in a housing 114. The piston 112 includes a piston head 116 sized to snugly fit within the housing 114 and a piston tail 118 connected to and extending from the piston head 116. A substantially inelastic connecting member 120 extends from the piston tail 118 to the throttle plate 102, such that movement of the piston 112 (and therefore the piston tail 118) actuates movement of the throttle plate 102 to increase or decrease the orificial area. In other words, movement of the piston 112 in one direction opens the throttle plate 102 while movement of the piston 112 in the other direction closes the throttle plate 102. The connecting member 120 is preferably has an adjustable length to facilitate fine tuning the relationship between the throttle plate 102 and the piston 112.

The housing 114 is functionally divided by the piston head 116 into two portions of variable volume, an intake portion 124 and an exhaust portion 126. Preferably, the piston head 116 forms a substantially gas-tight seal with the interior of the housing 114, such that gasses do not travel from one housing portion 124, 126 to the other 126, 124. In other words, the piston head 116 acts as a movable divider between the two housing portions 124, 126. The intake portion 124 includes an intake gas inlet 128 formed therethrough, and the exhaust portion 126 includes an exhaust gas inlet 130 formed therethrough. The exhaust gas inlet 130 is connected in fluidic communication to the exhaust manifold 104 by an first pneumatic line, while the intake gas inlet 128 is connected in fluidic communication to an intake manifold 132 by a second pneumatic line. The intake manifold 132 receives intake gasses (e.g., air) from a compressor 134 in pneumatic communication therewith. The first pneumatic line preferably extends from the intake gas inlet 128 to pneumatically connect to the intake manifold 132, but may alternately pneumatically connect to any point in the pneumatic connection between the compressor 134 and the intake manifold 132. Likewise, the second pneumatic line preferably extends from the exhaust gas inlet 130 to pneumatically connect to the exhaust manifold 104, but may alternately pneumatically connect to any point in the pneumatic connection between the exhaust manifold 104 and the throttle plate 102.

In this embodiment an EGR system 140 is connected to the engine 108, although other embodiments are contemplated without EGR systems. The EGR system 140 includes an exhaust gas cooling chamber 142 preferably pneumatically connected between the exhaust gas manifold 104 and the intake manifold 132, although the gas cooling chamber 142 may have one connection at any point between the exhaust gas manifold 104 and the throttle plate 102 and another connection at any point between the compressor 134 and the intake manifold 132. The EGR system 140 more preferably includes an EGR valve 144 pneumatically connected between the gas cooling chamber 142 and the exhaust manifold 104.

In operation, air from the engine operation environment enters the compressor 134 and is pressurized therein. The engine 108 receives pressurized air from the compressor 134 through the intake manifold 132. The pressure of the air at the intake manifold 134 is the intake manifold pressure. The air is mixed with fuel in the engine 108 and supports the combustion processes taking part therein. Exhaust gasses are produced as a by-product of combustion, and exit the engine through the exhaust manifold 104. The pressure of the exhaust gasses at the exhaust manifold 104 is the exhaust manifold pressure. The intake and exhaust manifolds 132, 104 are pneumatically linked to the housing through inlets 128, 130 such that the intake portion 124 is maintained at substantially the intake manifold pressure and the exhaust portion 126 is maintained at substantially the exhaust manifold pressure. The interior of the housing 114 behaves according to the gas laws, such that the product of the gas pressure in the intake portion 124 and the volume thereof is equal to the product of the gas pressure in the exhaust portion 126 and the volume thereof. In other words $P_{INTAKE}V_{INTAKE}=P_{EXHAUST}V_{EXHAUST}$. The volumes of the intake and exhaust portions 124, 126 will vary as with the relative intake and exhaust manifold pressures. When the intake manifold pressure increases relative the exhaust manifold pressure, the volume of the intake portion 124 will increase relative the volume of the exhaust portion. Likewise, when the intake manifold pressure decreases relative the exhaust manifold pressure, the volume of the intake portion 124 will decrease relative the volume of the exhaust portion. As the volumes of the intake and exhaust portions 124, 126 change, the piston 116 moves within the housing 114. The inelastic connecting member 120 joins the throttle plate 102 to the piston 112 such that when the piston 112 moves in response to the intake manifold pressure increasing relative the exhaust manifold pressure (i.e., the piston head 116 travels into the exhaust portion 126 allowing the intake portion 124 to expand relative the exhaust portion 126), the throttle plate 102 is urged closed. Urging the throttle plate 102 closed acts to increase the back-pressure on the escaping exhaust gasses, thereby increasing the exhaust manifold pressure. Likewise, when the piston moves in response to the intake manifold pressure decreasing relative the exhaust manifold pressure (i.e., the piston head 116 travels into the intake portion 124 allowing the exhaust portion 126 to expand relative the intake portion 124), the throttle plate 102 is urged open. Urging the throttle plate 102 open acts to decrease the back-pressure on the escaping exhaust gasses, thereby decreasing the exhaust manifold pressure.

The piston 116 is preferably formed from a structural material of suitable strength and toughness, such as stainless steel or the like. Likewise, the housing 114 is also formed of stainless steel or the like. The throttle plate 102, the piston 112, and the housing 114 must be resistant to any corrosive or deleterious effects of hot exhaust gasses.

Careful selection of the parameters of the system (i.e., the dimensions of the various gas conduits, the dimensions of the housing 114 and piston 112, the mass of the piston 112, the size of the throttle plate 102, the size of the throttle plate aperture, the dimensions and calibration of the member 120 connecting the piston 112 to the throttle plate 102, etc. . . . ) allow for precise control of the range of exhaust manifold pressure relative the intake manifold pressure. Careful selection of these parameters constitutes preselection of the desired exhaust gas pressure parameters of the engine 108. This allows for automatic control of the exhaust gas pressure without the requirement of electronic controllers and/or sensors. Moreover, the system 100 of the present invention eliminates the necessity and expense of the complex control algorithms. If an EGR system 140 is connected to the engine 108, the pneumatic throttle system 100 may be calibrated to ensure proper exhaust gas flow through the EGR system over the widest possible range of engine operating conditions.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. A pneumatic throttle system, comprising:
   an engine having an intake manifold and an exhaust manifold;
   a throttle plate operative to restrict gas flow from the exhaust manifold, positioned in pneumatic communication with the exhaust manifold; and
   a pneumatic actuator assembly further comprising:
      a housing having an air intake portion and an exhaust portion;
      a piston head movably positioned in the housing and separating the intake and exhaust portions;
      a piston tail portion extending from the piston head portion and operationally connected to the throttle plate;
      a first gas inlet formed in the intake portion; and
      a second gas inlet formed in the exhaust portion;
   wherein the first gas inlet is pneumatically connected to the intake manifold;
   wherein the second gas inlet is pneumatically connected to the exhaust manifold;
   wherein the piston head moves in the housing in response to changes in intake manifold pressure relative to exhaust manifold pressure; and
   wherein movement of the piston actuates operation of the throttle plate.

2. The system of claim 1 wherein the throttle plate is adapted to open and close, wherein opening of the throttle plate decreases exhaust manifold pressure, and wherein closure of the throttle plate increases exhaust manifold pressure.

3. The system of claim 1, wherein the intake portion has a variable intake portion volume, wherein the exhaust portion has a variable exhaust portion volume, wherein the sum of the intake portion volume and the exhaust portion volume is a constant; wherein movement of the piston head in response to an increase in intake manifold pressure relative to exhaust manifold pressure increases the relative volume of the intake portion and actuates the throttle plate to increase exhaust manifold pressure; and wherein movement of the piston head in response to a decrease in intake manifold pressure relative to exhaust manifold pressure decreases the relative volume of the intake portion and actuates the throttle plate to decrease exhaust manifold pressure.

4. The system of claim 1 further comprising an exhaust gas recirculation system pneumatically connected between the exhaust gas manifold and the intake manifold.

5. The system of claim 4 wherein the exhaust gas recirculation system includes an exhaust gas cooler in fluidic communication with the exhaust manifold and the intake manifold.

6. An engine exhaust system, comprising:
   an engine;
   an air intake manifold having an intake manifold pressure and positioned in fluidic communication with the engine;
   an exhaust manifold having an exhaust manifold pressure and positioned in fluidic communication with the engine;
   a compressor in fluidic communication with the air intake manifold;
   an exhaust port in fluidic communication with the exhaust manifold;
   a throttle plate fluidically connected between the exhaust manifold and the exhaust port;
   an exhaust gas recirculator fluidically connected between the exhaust manifold and the intake manifold; and
   a pneumatic control actuator fluidically connected to the intake manifold and to the exhaust manifold and operationally connected to the throttle plate;
   wherein the throttle plate is adapted to open and close;
   wherein an increase in intake manifold pressure relative to exhaust manifold pressure actuates closure of the throttle plate;
   wherein a decrease in intake manifold pressure relative to exhaust manifold pressure actuates opening of the throttle plate;
   wherein closure of the throttle plate increases exhaust manifold pressure; and
   wherein opening of the throttle plate decreases exhaust manifold pressure.

7. The engine exhaust system of claim 6 wherein the pneumatic control actuator is adapted to automatically control the throttle plate in response to a change in the ratio of intake manifold pressure to exhaust manifold pressure.

8. The engine exhaust system of claim 6 wherein the pneumatic control actuator comprises:
   an intake portion having a variable size;
   an exhaust portion having a variable size; and
   a piston head separating the intake portion and the exhaust portion and operationally connected to the throttle plate;
   wherein the intake portion is maintained at substantially the intake manifold pressure;
   wherein the exhaust portion is maintained at substantially the exhaust manifold pressure; and
   wherein the piston head is adapted to move in response to a change in the ratio of intake manifold pressure to exhaust manifold pressure.

9. A mechanical system comprising:
an exhaust manifold having an exhaust manifold pressure;
an exhaust gas conduit connecting the exhaust gas manifold to the atmosphere;
a throttle positioned in the exhaust gas conduit between the exhaust gas manifold and the atmosphere;
an intake manifold having an intake manifold pressure; and
a pneumatic actuator assembly further comprising:
  a first chamber portion having a first volume pneumatically connected to the intake manifold;
  a second chamber portion having a second volume pneumatically connected to the exhaust manifold;
  a piston head movably positioned between the first and second chambers and operationally connected to the throttle;
wherein the sum of the first and second volumes is substantially constant;
wherein the first and second volumes are functions of the intake manifold pressure and the exhaust manifold pressure;
wherein changes in the first and second volumes actuates movement of the piston head; and
wherein movement of the piston head actuates movement of the throttle.

10. The mechanical system of claim 9 wherein the movement of the throttle is automatically actuated by a change in the intake manifold pressure relative to exhaust manifold pressure.

11. The mechanical system of claim 9 wherein an increase in the first volume actuates operation of the throttle to restrict gas flow therethrough and to increase the exhaust manifold pressure.

12. The mechanical system of claim 9 wherein an increase in the second volume actuates operation of the throttle to increase gas flow therethrough and to decrease the exhaust manifold pressure.

13. The mechanical system of claim 9 wherein the piston head moves such that the product of the first volume and the intake manifold pressure is substantially equal to the product of the second volume and the exhaust manifold pressure.

14. The mechanical system of claim 9 further comprising an exhaust gas recirculation system pneumatically connected between the exhaust gas manifold and the intake manifold.

15. A method of regulating the exhaust manifold pressure of an internal combustion engine, comprising the steps of:
a) providing an internal combustion engine having an air intake and an exhaust manifold, wherein the exhaust manifold emits exhaust gasses when the engine is running;
b) providing a throttle adapted to selectively restrict the flow of exhaust gasses from the exhaust manifold;
c) providing an automatic pneumatic controller pneumatically connected to the intake manifold and to the exhaust manifold and operationally connected to the throttle;
d) circulating exhaust gasses from the exhaust manifold into the controller;
e) restricting the flow of the exhaust gasses when the ratio of the intake manifold pressure to the exhaust manifold pressure increases; and
f) increasing the flow of exhaust gasses when the ration of the intake manifold pressure tot the exhaust manifold pressure decreases.

16. The method of claim 15 wherein the controller includes:
a first portion of variable volume pneumatically connected to the intake manifold;
a second portion of variable volume pneumatically connected to the exhaust manifold; and
a movable divider separating the first and second portions and operationally connected to the throttle;
wherein the sum of the variable volumes of the first and second portions is substantially constant;
wherein an increase in intake manifold pressure relative to exhaust manifold pressure actuates an increase in the volume of the first portion and a corresponding decrease in the volume of the second portion; and
wherein an increase in exhaust manifold pressure relative to intake manifold pressure actuates an increase in the volume of the second portion and a corresponding decrease in the volume of the first portion.

17. The method of claim 16 wherein an increase in the volume of the first portion and a corresponding decrease in the volume of the second portion actuates movement of the divider towards the second portion; wherein movement of the divider towards the second portion actuates the throttle to decrease gas flow therethrough, wherein an increase in the volume of the second portion and a corresponding decrease in the volume of the first portion actuates movement of the divider toward the first portion; and wherein movement of the divider towards the first portion actuates the throttle to increase gas flow therethrough.

* * * * *

UNITED STATES PATENT AND TRADEMARK OFFICE
CERTIFICATE OF CORRECTION

PATENT NO. : 6,321,536 B1
DATED : November 27, 2001
INVENTOR(S) : Henderson et al.

It is certified that error appears in the above-identified patent and that said Letters Patent is hereby corrected as shown below:

Column 1,
Line 9, insert -- of -- between "maintaining" and "sufficient".
Line 67, replace "actuates" with -- actuated --.

Column 2,
Line 24, insert -- of -- between "maintaining" and "sufficient".

Column 3,
Line 24, delete "in" between "the" and "exhaust gas stream".
Line 44, delete "is" after member 120".
Line 60, replace "an" with -- a --.

Column 8,
Line 12, replace "ration" with -- ratio --.
Line 13, replace "tot" with -- to --.

Signed and Sealed this

Fourth Day of June, 2002

Attest:

JAMES E. ROGAN
Attesting Officer    Director of the United States Patent and Trademark Office